US006454965B1

(12) United States Patent
Ching et al.

(10) Patent No.: US 6,454,965 B1
(45) Date of Patent: *Sep. 24, 2002

(54) OXYGEN SCAVENGING POLYMERS IN RIGID POLYETHYLENE TEREPHTHALATE BEVERAGE AND FOOD CONTAINERS

(75) Inventors: Ta Yen Ching, Novato; Gangfeng Cai, Danville; Hu Yang, San Ramon; James P. Leonard, San Rafael; Joseph L. Goodrich, Lafayette, all of CA (US); Mark Steven Galland, Orange, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/275,312

(22) Filed: Mar. 24, 1999

(51) Int. Cl.$^7$ .................. C09K 15/04; C09K 15/06; C09K 15/02; B29D 22/00; B65D 5/00
(52) U.S. Cl. .................. 252/188.28; 428/35.2; 428/35.4; 428/36.6; 428/36.7
(58) Field of Search .................. 252/188.28; 428/35.4, 428/35.2, 36.6, 36.7, 346, 518, 515; 525/330.6, 330.3, 370, 371, 372, 384

(56) References Cited

U.S. PATENT DOCUMENTS

| | | | |
|---|---|---|---|
| 3,497,571 A | 2/1970 | Tellier et al. ................ 260/844 |
| 3,536,687 A | 10/1970 | Nordstrom .................. 260/89.5 |
| 4,298,762 A | * 11/1981 | Ehmann et al. ............. 568/433 |
| 4,415,710 A | 11/1983 | Barnabeo et al. ........... 525/370 |
| 4,524,201 A | 6/1985 | Barnabeo et al. ........... 528/395 |
| 5,021,515 A | 6/1991 | Cochran et al. |
| 5,034,252 A | 7/1991 | Nilsson et al. |
| 5,049,624 A | 9/1991 | Adams et al. |
| 5,116,916 A | 5/1992 | Young ........................ 525/350 |
| 5,211,875 A | 5/1993 | Speer et al. |
| 5,346,644 A | 9/1994 | Speer et al. |
| 5,350,622 A | 9/1994 | Speer et al. |
| 5,399,289 A | 3/1995 | Speer et al. ........... 252/188.28 |
| 5,425,896 A | 6/1995 | Speer et al. ........... 252/188.28 |
| 5,466,756 A | 11/1995 | Roach et al. ............. 525/330.6 |
| 5,498,364 A | 3/1996 | Speer et al. ........... 252/188.28 |
| 5,529,833 A | 6/1996 | Speer et al. |
| 5,627,239 A | * 5/1997 | Ching et al. .............. 525/330.6 |
| 5,639,815 A | 6/1997 | Cochran et al. |
| 5,641,825 A | 6/1997 | Bacskai et al. |
| 5,656,692 A | 8/1997 | Hayes ......................... 525/63 |
| 5,660,761 A | 8/1997 | Katsumoto et al. |
| 5,700,554 A | 12/1997 | Speer et al. |
| 5,736,616 A | 4/1998 | Ching et al. |
| 5,776,361 A | 7/1998 | Katsumoto et al. |
| 5,837,158 A | 11/1998 | Shepodd et al. ......... 252/181.6 |
| 5,859,145 A | 1/1999 | Ching et al. |
| 6,057,013 A | 5/2000 | Ching et al. ............... 428/35.7 |
| 6,063,307 A | 5/2000 | Shepodd et al. ......... 252/181.6 |
| 6,254,802 B1 | * 7/2001 | Spees et al. ........... 252/188.28 |
| 6,254,803 B1 | * 7/2001 | Matthews et al. ...... 252/188.28 |

FOREIGN PATENT DOCUMENTS

| | | |
|---|---|---|
| WO | WO 95/02616 | 1/1995 |
| WO | WO96/40799 | 12/1996 |
| WO | WO98/12127 | 3/1998 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

* cited by examiner

*Primary Examiner*—Joseph D. Anthony
(74) *Attorney, Agent, or Firm*—Williams, Morgan & Amerson, P.C.

(57) ABSTRACT

Multilayer plastic containers for food and beverage packaging which incorporate oxygen scavenging resins which selectively oxidize upon activation without giving off odorous fragments.

13 Claims, No Drawings

OXYGEN SCAVENGING POLYMERS IN RIGID POLYETHYLENE TEREPHTHALATE BEVERAGE AND FOOD CONTAINERS

FIELD OF THE INVENTION

The present invention relates to rigid polymeric food or beverage containers comprising polyester such as polyester terephthalate or polyester naphthalate and oxygen scavenging polymer.

BACKGROUND OF THE INVENTION

Multilayer rigid container structures, which utilize an oxygen scavenging composition, are known. In the container wall, base polymers such as polyethylene terephthalate have been used along with an oxygen scavenger. The resulting multilayer package wall includes at least an oxygen scavenger core layer as well as inner and outer layers having high oxygen barrier qualities. The oxygen scavenger core layer is a combination of at least an oxygen scavenging polymer with post consumer-polyethylene terephthalate (PC-PET). The inner and outer layers include at least oxygen barrier quality PET.

Furthermore, multilayered plastic bottles having oxygen scavenging capacity sufficient to maintain substantially zero or near zero presence of oxygen in the bottle cavity under specified storage conditions have also been disclosed. The multilayered bottle wall has at least three layers. The inner and outer layers are PET or another bottling polyester, which define the bottle cavity and the outside skin of the bottle respectively. Between the inner and outer layers is an oxygen scavenging copolyester layer.

Condensation copolymers used for making bottles with polyester such as PET or polyethylene naphthalate (PEN) have also been disclosed. The condensation copolymers comprise predominantly polyester segments and an oxygen scavenging amount of polyolefin oligomer segments. The copolymers are preferably formed by transesterification during reactive extrusion and typically comprise about 0.5 to about 12 wt. % of polyolefin oligomer segments. In a preferred embodiment, a bottle is provided having a multilayer wall of at least three layers. The outer and inner layers are of unmodified PET and the oxygen scavenging layer in between the outer and inner layer is made of the condensation copolymers described above having an oxygen scavenging amount of polyolefin oligomers.

A transparent oxygen-scavenging article for packaging oxygen sensitive products is also known, the oxygen-scavenging article having a multilayered wall including at least three layers, an inner and outer layer of biaxially-oriented aromatic polyester polymers such as PET or PEN and an oxygen-scavenging aromatic ester polymer compatible with the polyester polymer. The oxygen-scavenging aromatic ester polymer must include ketone carbonyl groups to provide the oxygen-scavenging functionality and aromatic and ester groups for compatibility with the polyester.

PET containers have been disclosed that have a container wall of stretched plastic material with high oxygen barrier properties and an activating metal incorporated into the plastic material. The plastic material is PET in admixture with a polyamide and the metal is either added to the mixture or contained in one or both of the polymers.

A container containing at least one layer containing a plastics material and ions of at least one metal has also been disclosed. The plastics material in the layer consists of at least a partially split or degraded polyamide which has increased sensitivity to reaction with oxygen in the presence of metal thus giving the layer improved oxygen barrier properties.

A container has been disclosed with a wall having high oxygen barrier properties comprising a molded polymer composition, the composition comprising a granular mixture of (1) a first polymer providing essential strength for the container wall and (2) an active component comprising a metal compound capable of scavenging oxygen and consisting essentially of a metal ion having complexing properties and a polymer to which said metal ion is combined as a metal complex in the molded polymer composition of said wall to scavenge oxygen. There is also disclosed a method of producing the polymer composition which can be molded into containers, the method being to treat a polymer with a metal compound dissolved or slurried in a volatile solvent composition during refluxing conditions for obtaining the active component having capacity to scavenge oxygen.

An article has been disclosed with oxygen barrier properties comprising at least partly a molded polymer composition formed by melting granules of the composition and molding the melted composition to produce the article. The composition comprises a granular mixture of (1) a first polymer composition providing strength for the article and (2) a second polymer composition compatible with the first polymer composition. The second polymer composition is obtainable by reacting a polyamide or copolyamide with a solution of a transition metal compound in a volatile solvent under refluxing conditions. The polymer of the first polymer composition can be any polymer and the metal of the metal compound reacted with the polyamide or copolyamide can be any transition metal. The amount of metal in the second polymer composition is at least 500 ppm.

A polymer material having increased sensitivity to reaction with oxygen has also been disclosed, the polymer material comprising a polyamide, which has been reacted with a nucleophilic reagent and possibly an activator. The nucleophilic reagent is selected from the group consisting of compounds containing at least one hydroxyl group, compounds containing at least one alkoxide group, phosphate compounds, pyrophosphate compounds, polyphosphate compounds, salts of organic acids and a copolymer of vinyl alcohol and ethylene. The activator is in the form of a hydrogen donor. A process is also disclosed for producing the polymer material, which has increased sensitivity of reaction with oxygen. In the process, a polyamide reacts with the nucleophilic reagent under such conditions that the polymer material is obtained.

Such polymeric containers of PET, PEN and/or polyamide as described above utilize oxidizable components to react with and decrease the amount of oxygen in contact with oxygen sensitive materials packaged in containers. All of these oxidizable materials have the disadvantage of imparting unpleasant odor and/or taste to the packaged materials because of the byproducts given off during the oxidation of the oxidizable materials. Another problem is the uncontrolled oxidation fragmentation from the polymer backbone which leads to chain secession, thus weakening the physical integrity of the multilayer container structures.

In contrast, the present invention achieves a rigid beverage and food container comprising PET and/or PEN, the container incorporating an oxygen scavenging component of cyclic olefin which does not give off odor and or taste as a result of its oxygen scavenging function. The oxidation also does not cause a change in molecular weight. This is because the cyclic olefin oxygen scavenging component does not fragment as it oxidizes, thus avoiding the problem of imparting oxidation byproducts to the packaged material while maintaining the structural integrity.

SUMMARY OF THE INVENTION

The present invention relates to a non-odorous oxygen scavenging polymer composition comprising: (1) monomers derived from cyclic hydrocarbon moieties having at least one cyclic allylic or cyclic benzylic hydrogen and (2) a transition metal oxidation catalyst. The present invention also relates to a rigid container for food or beverage, the container being molded from a resin comprising the above-described non-odorous oxygen scavenging polymer composition. The present invention also relates to the above-described rigid container further comprising a tinted ultraviolet protection layer, which may or may not be the food contact layer, located between the layer comprising the non-odorous oxygen scavenging composition and the inside of the rigid container.

In a preferred embodiment of the above non-odorous oxygen scavenging polymer composition, wherein the composition comprises a vinyl polymer selected from the group consisting of ethylene polymer, ethylene copolymer, propylene polymer, propylene copolymer, styrene polymer, styrene copolymer and mixtures thereof.

In another preferred embodiment of the above non-odorous oxygen scavenging polymer composition, the composition comprises condensation polymers selected from the group consisting of polyesters, polyamides, polycarbonate, polyurethane, polyureas and polyether.

In a more preferred embodiment of the above composition comprising condensation polymers, the composition is thermoplastic.

In another more preferred embodiment of the above composition comprising condensation polymers, the composition is thermoset.

In yet another more preferred embodiment of the above composition comprising condensation polymers, the composition is a multilayered structure with other layers being an aromatic polyester or copolyester selected from the group consisting of polyethylene terephthalate, polyethylene naphthalate, polypropylene terephthalate, polybutylene terephthalate, polyethylene isophthalate, polycyclohexanedimethanol terephthalate, polybutylene naphthalate, polycyclohexanedimethanol naphthalate, and copolymers and blends thereof.

In still another more preferred embodiment of the above composition comprising condensation polymers, the composition is a multilayered structure with other layers being polyamides or copolyamides selected from the group consisting of Nylon 6, Nylon 66, Nylon 610 and mixtures thereof.

In yet another more preferred embodiment of the above composition comprising condensation polymers, the composition is a multilayered structure with other layers being bisphenol A carbonate.

In yet another more preferred embodiment of the above composition comprising condensation polymers, the composition is a multilayered structure with other layers being vinylic polymers or copolymers selected from the group consisting of ethylene polymer, ethylene copolymer, propylene polymer, propylene copolymer, styrene polymer, styrene copolymer, acrylate polymer, acrylate copolymer, vinyl chloride polymer, vinyl chloride copolymer, divinyl chloride polymer, divinyl chloride copolymer, fluorinated vinyl polymer, fluorinated vinyl copolymer and mixtures thereof.

In still another more preferred embodiment of the above composition comprising condensation polymers, the composition is blended with an aromatic polyester or copolyester selected from the group consisting of polyethylene terephthalate, polyethylene naphthalate, polypropylene terephthalate, polybutylene terephthalate, polyethylene isophthalate, polycyclohexandedimethanol terephthalate, polybutylene naphthalate, polycyclohexanedimethanol naphthalate, and copolymers and blends thereof.

In yet another more preferred embodiment of the above composition comprising condensation polymers, the composition is blended with polyamides or copolyamides selected from the group consisting of Nylon 6, Nylon 66, Nylon 610 and mixtures thereof.

In still another more preferred embodiment of the above composition comprising condensation polymers, the composition is blended with bisphenol A polycarbonate.

In yet another more preferred embodiment of the above composition comprising condensation polymers, the composition being a blend comprising vinylic polymers or copolymers selected from the group consisting of ethylene polymer, ethylene copolymer, propylene polymer, propylene copolymer, styrene polymer, styrene copolymer, acrylate polymer, acrylate copolymer, vinyl chloride polymer, vinyl chloride copolymer, divinyl chloride polymer, divinyl chloride copolymer, fluorinated vinyl polymer, fluorinated vinyl copolymer and mixtures thereof.

In a more preferred embodiment of the above composition comprising condensation polymers, the composition is laminated or adhering onto a substrate selected from the group consisting of paper, foil, high temperature film, metallized film, polyamide films, ethylene vinyl alcohol film, silica coated film, nylon/EVOH/nylon, oriented polypropylene, polyester film, polyethylene, polypropylene, polyester, oriented polyethylene terephthalate and cellophane.

In another preferred embodiment of the above non-odorous oxygen scavenging polymer composition, the cyclic allylic monomers are selected from the group consisting of structure (I), structure (II) and structure (III):

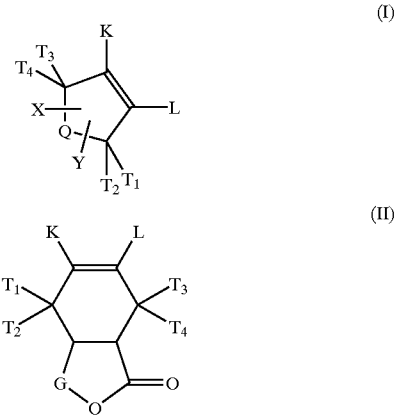

-continued (III)

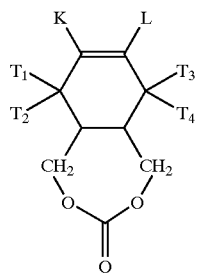

with K, L, $T_1$, $T_2$, $T_3$, and $T_4$ being selected from the group consisting of —$C_qH_{2q+1}$ with q being an integer in the range from 0 to 12 and wherein, when either K or L is —H, at least one of $T_1$, $T_2$, $T_3$ and $T_4$ is —H;

and with X and Y being selected from the group consisting of —$(CH_2)_n$—OH, —$(CH_2)_n$—$NH_2$, —$(CH_2)_n$NC═O and —$(CH_2)_m$—(C═O)—A with n being an integer in the range from 1 to 12 and m being an integer in the range from 0 to 12 and A being selected from the group consisting of —OH, —$OCH_3$, —$OC_2H_5$, —$OC_3H_7$ and halides; and Q being selected from the group consisting of —$(C_tH_{2t-2})$ with t being an integer in the range from 1 to 4;

and with G being selected from —(C═O)— and —$(C_nH_{2n+1})$— with n being an integer from 0 to 12.

In yet another more preferred embodiment of the above non-odorous oxygen scavenging polymer composition, the cyclic benzylic monomers are selected from the group consisting of structure (IV), structure (V), structure (VI), structure (VII), structure (VIII), and structure (IX)

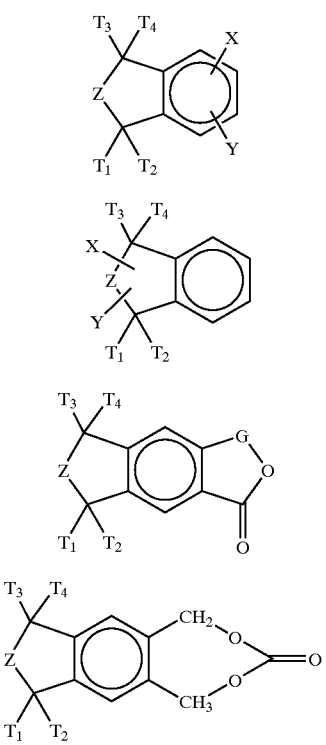

-continued (VIII)

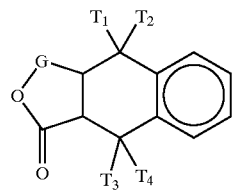

(IX)

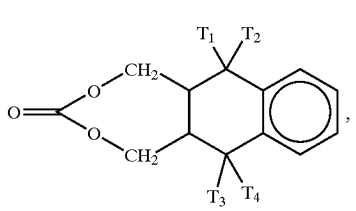

where X and Y are selected from the group consisting of —$(CH_2)_n$—OH, —$(CH_2)_n$—$NH_2$ and —$(CH_2)_m$—(C═O)—$R_1$ with n being an integer in the range from 1 to 12, and with m being an integer in the range from 0 to 12 and with $R_1$ being selected from the group consisting of —OH, —$OCH_3$, —$OC_2H_5$, —$OC_3H_7$ and halides;

with $T_1$, $T_2$, $T_3$, and $T_4$ being selected from the group consisting of —$C_qH_{2q+1}$ with q being an integer in the range from 0 to 12 and at least one of $T_1$, $T_2$, $T_3$ and $T_4$ being —H;

and with X and Y being selected from the group consisting of —$(CH_2)_n$—OH, —$(CH_2)_n$—$NH_2$, —$(CH_2)_n$NC═O, and —$(CH_2)_m$—(C═O)—A with n being an integer in the range from 1 to 12, and m being an integer in the range from 0 to 12 and A being selected from the group consisting of —OH, —$OCH_3$, —$OC_2H_5$, —$OC_3H_7$ and halides; and Z being selected from the group consisting of —$(C_tH_{2t-2})$—, —O—, —$NR_2$—, —S—, with t being an integer in the range from 1 to 4 and $R_2$ being selected from the group consisting of —OH, —$OCH_3$, —$OC_2H_5$, —$OC_3H_7$ and halides;

and with G being selected from —(C═O)— and —$(C_nH_{2n+1})$— with n being an integer from 0 to 12.

In still another more preferred embodiment, the composition of the resin of the above-described rigid container is a single layer.

In yet another more preferred embodiment, the composition of the resin of the above-described rigid container is multilayered.

In yet another more preferred embodiment, the composition of the resin of the above-described rigid container comprises an outer air contact layer and an inner oxygen scavenging layer.

In still another more preferred embodiment, the outer air contact layer of the composition of the resin of the above-described rigid container comprises an oxygen barrier resin selected from the group consisting of polyethylene terephthalate, polyethylene naphthalate and a mixture of polyethylene terephthalate and polyethylene naphthalate.

In yet another more preferred embodiment, the composition of the resin of the above-described rigid container further comprises at least one of an inner food contact layer, a tie layer, and a tinted ultraviolet protection layer.

In still another more preferred embodiment, the inner food contact layer of the composition of the resin of the above-described rigid container comprises an oxygen barrier resin selected from the group consisting of polyethylene terephthalate, polyethylene naphthalate and a mixture of polyethylene terephthalate and polyethylene naphthalate.

In yet another more preferred embodiment, the oxygen scavenging of the composition of the resin of the above-described rigid container is initiated by moisture or actinic radiation.

In still another more preferred embodiment, the transition metal catalyst of the composition of the resin of the above-described rigid container is a metal salt.

In yet another more preferred embodiment, the metal in the metal salt of the transition metal catalyst of the composition of the resin of the above- described rigid container is cobalt.

In still another more preferred embodiment, the metal salt of the transition metal catalyst of the composition of the resin of the above-described rigid container is selected from the group consisting of cobalt neodecanoate, cobalt 2-ethylhexanoate, cobalt oleate and cobalt stearate.

In yet another more preferred embodiment, the composition of the resin of the above-described rigid container further comprises at least one triggering material to enhance initiation of oxygen scavenging.

In still another more preferred embodiment, the triggering material of the resin of the composition of the above-described rigid container is a photoinitiator.

In yet another more preferred embodiment, the photoinitiator of the resin of the composition of the above-described rigid container has an ultraviolet absorption window above 320 nm.

In still another more preferred embodiment, the above-described rigid container is suitable for packaging oxygen sensitive drinks for extended freshness and shelf life.

In yet another more preferred embodiment, the above-described rigid container is suitable for packaging beer.

DETAILED DESCRIPTION OF THE INVENTION

Applicants have achieved a composition for a rigid beverage and food container comprising PET and/or PEN, the container incorporating an oxygen scavenging component of cyclic olefin which oxidizes oxygen in the interior oft the container without giving off odor and/or taste as a result of its oxygen scavenging function, nor does it cause a change in molecular weight. This is because the cyclic olefin oxygen scavenging component does not fragment as it oxidizes. Thus, the composition maintains the structural integrity of the container while avoiding the problem of imparting oxidation byproducts to the packaged material.

The invention will be further illustrated by the following examples, which set forth particularly advantageous method embodiments. While the Examples are provided to illustrate the present invention, they are not intended to limit it.

EXAMPLE 1

Synthesis of 3-Cyclohexene-1,1-Dimethanol

One hundred (100) parts by weight of a formaldehyde aqueous solution (37 wt. % formaldehyde) was charged to a reactor. To this solution, cooled externally with an ice-water bath, was added 118 parts of an aqueous sodium hydroxide solution (25 wt. % sodium hydroxide) by several portions and the temperature of the reaction content was maintained at 20 to 30° C. This was followed by a slow addition of 54 parts of 1,2,5,6-tetrahydrobenzaldehyde at such a rate that the reaction content temperature did not exceed 55° C. After the exotherm dissipated, it was heated at 55° C. for two hours with an external heating. The product precipitated out of the solution upon cooling and was collected by suction filtration. The wet-cake was washed thoroughly in the funnel with copious amount of water (5×100 parts). The crude product was allowed to dry in air overnight and purified by a recrystallization from toluene. The final product was an off-white colored crystalline material (yield 70%. m.p.: 92–93° C.).

EXAMPLE 2

Synthesis of 4-Cyclohexene-1,2-Dimethanol

A solution of one hundred (100) parts by weight of a 1,2,3,6-tetrahydrophthalic anhydride in 500 parts of dry tetrahydrofuran is slowly added to a stirring mixture of 28.75 parts of lithium aluminum hydride and 162 parts of tetrahydrofuran. After the addition is complete, the mixture is refluxed for 24 hours. It is then hydrolyzed by a slow addition of a saturated Rochelle salt solution until it turns white. The mixture is refluxed for an additional 10 hours, allowed to room temperature, and suction filtered. The solvent is removed by a distillation and the viscous liquid crude product is purified by a fractional distillation under vacuum (yield 82%. b.p.: 165–170° C. at 12 mm).

EXAMPLE 3

Synthesis of trans-Diethyl 1,2,3,6-Tetrahydrophthalate

One hundred (100) parts by weight of a butadiene is dissolved into a solution of 153 parts of diethyl fumarate in 650 parts of benzene at 0° C. The reaction solution is then heated in a bomb at 50° C. for 24 hours. The solvent is removed by a distillation and the liquid crude product is purified by a fractional distillation under vacuum (b.p.: 102–105° C. at 2 mm);

EXAMPLE 4

Synthesis Of Polyester Containing 3-Cyclohexene-1,1-Dimethanol

Dimethyl terephthalate (81.9 g), ethylene glycol (43.7 g), 3-cyclohexene-1,1-dimethanol (20.0 g), and titanium butoxide (0.15 g) were charged into a 250 mL 4-necked flask equipped with a distillation column/partial condenser. The agitator and heat were turned on under nitrogen sparge (5 ml/min). When the temperature reached 140–170° C., the methanol collection was started. The temperature was slowly increased to 230° C. The reaction temperature was held at 230–240° C. until greater than 95% of the methanol was collected during the course of 2–3 hours at 250–260° C. under a full vacuum (0.5–2 mm Hg). The final polyester was discharged into an aluminum pan at about 200° C. under nitrogen protection. NMR showed that the polyester contained about 22 wt. % 3-cyclohexene-1,1-dimethanol unit. DSC showed that the polyester was totally amorphous and had a glass transition temperature of 82° C.

EXAMPLE 5

Synthesis of Polyester Containing 3-Cyclohexene-1, 1-Dimethanol

Dimethyl terephthalate (1165.2 g), ethylene glycol (621.0 g), 3-cyclohexene-1,1-dimethanol (284.4 g), zinc acetate dihydrate (2.08 g), and antimony oxide (0.62 g) are charged into a 3-liter reaction kettle equipped with a distillation column/partial condenser. The agitator and heat are turned on under nitrogen sparge (10–30 ml/min). When the temperature reaches 140–170° C., the methanol collection is started. After 1–3 hours at 160–190° C. under nitrogen, the temperature is slowly increased to 230° C. The reaction temperature is held at 230–240° C. until greater than 95% of the methanol is collected during the course of 2–6 hours. Triphenyl phosphite (1.0 g) is then added. The temperature is increased to 250–270° C., the nitrogen is stopped and vacuum is applied. The reaction mixture is held for 2–4 hours at 250–270° C. under a full vacuum (0.5–2 mm Hg). The final polyester is discharged into an aluminum pan at about 200° C. under nitrogen protection.

EXAMPLE 6

Synthesis Of Polyester Containing 3-Cyclohexene-1,1-Dimethanol

Following the procedure described in Example 5, dimethyl terephthalate (776.8 g), 1,3-propanediol (304.4 g), 3-cyclohexene-1,1-dimethanol (284.4 g), and titanium butoxide (1.3 g) are charged into a 3-liter reaction kettle equipped with a distillation column/partial condenser. Triphenyl phosphite (0.8 g) is added before increasing the reaction temperature from 230–240° C. to over 250° C. and applying vacuum.

EXAMPLE 7

Synthesis of Polyester Containing 1,2,3,6-Tetrahydrophthalic Acid

Ethylene glycol (248.1 g), 1,2,3,6-tetrahydrophthalic anhydride (456.6 g), hydrated monobutyltin oxide (0.7 g), and triphenyl phosphite (0.35 g) were charged into a 2-liter reaction flask equipped with a distillation column/partial condenser. The agitator and heat are turned on under nitrogen sparge (10–30 ml/min). When the temperature reaches 160–180° C., the water collection was started. After 1–3 hours at 160–190° C. under nitrogen, the temperature was slowly increased to 230° C. The reaction temperature was held at 230–240° C. until greater than 95% of the water was collected during the course of 2–6 hours. The temperature was increased to 250–270° C., the nitrogen was stopped and vacuum was applied. The reaction mixture was held for 2–4 hours at 250–270° C. under a full vacuum (0.5–2 mm Hg). The final polyester was discharged into an aluminum pan at about 200° C. under nitrogen protection. NMR confirmed that the polyester was a tetrahydrophthalic acid/ethylene glycol homopolyester. DSC showed that the polyester was totally amorphous and had a glass transition temperature of 27° C.

EXAMPLE 8

Synthesis Of Polyester Containing 3-Cyclohexene-1,1-Dimethanol and 1,2,3,6-Tetrahydrophthalic Acid Following the procedure described in Example 7, ethylene glycol (248.4 g), 1,2,3,6-tetrahydrophthalic anhydride (913.2 g), 3-cyclohexene-1,1-dimethanol (839.0 g), and hydrated monobutyltin oxide (1.0 g) are charged into a 3-liter reaction kettle equipped with a distillation column/partial condenser. Triphenyl phosphite (1.0 g) is added before increasing the reaction temperature from 230–240° C. to over 250° C. and applying vacuum.

EXAMPLE 9

Synthesis of Polyester Containing 3-Cyclohexene-11-Dimethanol and 1,2,3,6-Tetrahydrophthalic Acid Following the procedure described in Example 7, 2-methyl-1,3-propanediol (360.4 g), 1,2,3,6-tetrahydrophthalic anhydride (913.2 g), 3-cyclohexene-1,1-dimethanol (839.0 g), and hydrated monobutyltin oxide (1.0 g) are charged into a 3-liter reaction kettle equipped with a distillation column/partial condenser. Triphenyl phosphite (1.0 g) is added before increasing the reaction temperature from 230–240° C. to over 250° C. and applying vacuum.

EXAMPLE 10

Synthesis of Polyester Containing 1,2,3,6-Tetrahydrophthalic Acid

Following the procedure described in Example 7, 2 methyl-1,3-propanediol (720.8 g), 1,2,3,6-tetrahydrophthalic anhydride (913.2 g), and hydrated monobutyltin oxide (0.82 g) are charged into a 3-liter reaction kettle equipped with a distillation column/partial condenser. Triphenyl phosphite (0.82 g) is added before increasing the reaction temperature from 230–240° C. to over 250° C. and applying vacuum.

EXAMPLE 11

Synthesis of Polyester Containing 1,2,3,6-Tetrahydrophthalic Acid

Following the procedure described in Example 7, 1,3-propanediol (608.8 g), 1,2,3,6-tetrahydrophthalic anhydride (913.2 g), and hydrated monobutyltin oxide (0.76 g) are charged into a 3-liter reaction kettle equipped with a distillation column/partial condenser. Triphenyl phosphite (0.76 g) is added before increasing the reaction temperature from 230–240° C. to over 250° C. and applying vacuum.

EXAMPLE 12

Synthesis of Polyester Containing 3-Cyclohexene-1,1-Dimethanol

Following the procedure described in Example 7, 2-methyl-1,3-propanediol (180.2 g), adipic acid (584.4 g), 3-cyclohexene-1,1-dimethanol (569.6 g), and hydrated monobutyltin oxide (0.67 g) are charged into a 3-liter reaction kettle equipped with a distillation column/partial condenser. Triphenyl phosphite (0.67 g) is added before increasing the reaction temperature from 230–240° C. to over 250° C. and applying vacuum.

EXAMPLE 13

Synthesis of Polyester Containing 3-Cyclohexene-1,1-Dimethanol

Terephthalic acid (664.4 g), 3-cyclohexene-1,1-dimethanol (284.8 g), 2-methyl-1,3-propandiol (360.4 g), and hydrated monobutyltin oxide (0.75 g) are charged into a 3-liter reaction kettle equipped with a distillation column/partial condenser. The agitator and heat are turned on under nitrogen sparge (10–30 ml/min). When the temperature reaches 200–220° C., the water collection is started. After 3–7 hours at 200–230° C. under nitrogen, the temperature is increased to 240° C. The reaction temperature is held at 240° C. until greater than 95% of the water is collected during the course of 2–6 hours. Triphenyl phosphite (0.75 g) is then added. The temperature is increased to 250–270° C., the nitrogen is stopped and vacuum is applied. The reaction mixture is held for 2–4 hours at 250–270° C. under a full vacuum (0.5–2 mm Hg). The final polyester is discharged into an aluminum pan at about 200° C. under nitrogen protection.

EXAMPLE 14

Polymer prepared in Example 4 was solvent cast into a 3.5 mil film containing 2 wt. % cobalt in the form of cobalt oleate and 2 wt. % of anthraquinone as a long wavelength photoinitiator. A 5×20 cm$^2$ size film was cut and irradiated under a 450 watts medium pressure mercury UV lamp for 2 minutes prior to sealing into a foil pouch filled with 300 cc of 1% oxygen. The headspace analysis after 1 day at room temperature showed a reduction in oxygen concentration to 0.91%.

EXAMPLE 15

Polymer prepared in Example 7 was solvent cast into 2 mil film containing 0.2 wt. % cobalt in the form of cobalt oleate and 1 wt. % of anthraquinone. Irradiated under a 450 watts medium pressure mercury UV lamp for 2 minutes prior to sealing into a foil pouch filled with 300 cc of 1% oxygen. The headspace analysis after 4 days at room temperature showed a reduction in oxygen concentration to 0.83%.

While the present invention has been described with reference to specific embodiments, this application is intended to cover those various changes and those may make those substitutions skilled in the art without departing from the spirit and scope of the appended claims.

What is claimed is:

1. A non-odorous oxygen scavenging polymer composition comprising;
    a first layer comprising (1) a condensation polymer derived from cyclic hydrocarbon monomers having at least one cyclic allylic and (2) a transition metal oxidation catalyst;
    wherein the monomers comprising at least one cyclic allylic hydrogen have structure (I):

$$\text{(I)}$$

with K, L, $T_q$, $T_2$, $T_3$, and $T_4$ being selected from the group consisting of —$C_qH_{2q+1}$, with q being an integer in the range from 0 to 12 and wherein, when either K or L is —H, at least one of $T_1$, $T_2$, $T_3$ and $T_4$ is —H.
   and with X and Y being selected from the group consisting of —$(CH_2)_n$—OH, —$(CH_2)_n$—$NH_2$, —$(CH_2)_n$NC=O and —$(CH_2)_m$—(C=O)—A with n being an integer in the range from 1 to 12 and m being an integer in the range 0 to 12 and A being selected from the group consisting of —OH, —$OCH_3$, —$OC_2H_5$, —$OC_3H_7$ and halides; and Q being selected from the group consisting of —$(C_1H_{2t-2})$ with t being an integer selected from the group consisting of 1,3, and 4.

2. The composition of claim 1, wherein the composition further comprises
    condensation polymers selected from the group consisting of polyester, polyamides, polycarbonate, polyurethane, and polyether.

3. The composition of claim 1, the composition being thermoplastic.

4. The composition of claim 1, the composition being thermoset.

5. The composition of claim 1, wherein the composition further comprises at least one additional layer comprising an aromatic polyester or copolyester selected from the group consisting of polyethylene terephthalate, polyethylene naphthalate, polypropylene terephthalate, polybutylene terephthalate, polyethylene isophthalate, polycyclohexanedimethanol terephthalate, polybutylene naphthalate, polycyclohexanedimethanol naphthalate, and copolymers and blends thereof.

6. The composition of claim 1, wherein the composition further comprises at lest one additional layer comprising a polyamide or copolyamide selected from the group consisting of Nylon 6, Nylon 66, Nylon 610, and mixtures thereof.

7. The composition of claim 1, wherein the composition further comprises at least one additional layer comprising bisphenol A carbonate.

8. The composition of claim 1, wherein the composition further comprises at least one additional layer comprising a vinylic polymer or copolymer selected from the group consisting of ethylene polymer, ethylene copolymer, propylene polymer, propylene copolymer, styrene polymer, styrene copolymer, acrylate polymer, acrylate copolymer, vinyl chloride polymer, vinyl chloride copolymer, divinyl chloride polymer, divinyl chloride copolymer, fluorinated vinyl polymer, fluorinated vinyl copolymer, and mixtures thereof.

9. The composition of claim 1 wherein the composition further comprises an aromatic polyester or copolyester selected from the group consisting of polyethylene terephthalate, polyethylene naphthalate, polypropylene terephthalate, polybutylene terephthalate, polyethlylene isophthalate, polycyclohexandedimethanol terephthalate, polybutylene naphthalate, polycyclohexanedimethanol naphthalate, and copolymers and blends thereof.

10. The composition of claim 1, wherein the composition further comprises a polyamide or copolyamide selected from the group consisting of Nylon 6, Nylon 66, Nylon 610, and mixtures thereof.

11. The composition of claim 1, wherein the composition further comprises bisphenol A polycarbonate.

12. The composition of claim 1, wherein the composition further comprises a vinylic polymer or copolymer selected from the group consisting of ethylene polymer, ethylene copolymers, propylene polymer, propylene copolymer, styrene polymer, styrene copolymer, acrylate polymer, acrylate copolymer, vinyl chloride polymer, vinyl chloride copolymer, divinyl chloride polymer, divinyl chloride copolymer, fluorinated vinyl polymer, fluorinated vinyl copolymer, and mixtures thereof.

13. The composition of claim 1, wherein the composition is laminated or adhered to a substrate selected from the group consisting of paper, foil, high temperature film, metallized film, polyamide films, ethylene vinyl alcohol film, silica coated film, nylon/EVOH/nylon, oriented polypropylene, polyester film, polyethylene, polypropylene, polyester, oriented polyethylene terephthalate, and cellophane.

* * * * *

UNITED STATES PATENT AND TRADEMARK OFFICE
CERTIFICATE OF CORRECTION

PATENT NO. : 6,454,965 B1
DATED : September 24, 2002
INVENTOR(S) : Ta Yen Ching et al.

It is certified that error appears in the above-identified patent and that said Letters Patent is hereby corrected as shown below:

Title page,
Item [75], change co-inventor "Mark Steven Galland" to -- Mark Stephen Galland --.

Column 11,
Line 42, delete "$T_q$," and insert -- $T_1$, --.
Line 54, delete "$—(C_1H_{2t-2})$" and insert -- $—(C_tH_{2t-2})$ --.
Line 60, delete "polyester" and insert -- polyesters --.
Line 61, insert -- polyureas, -- before "and".

Column 12,
Line 13, delete "lest" and insert -- least --.

Signed and Sealed this

Twenty-ninth Day of July, 2003

JAMES E. ROGAN
*Director of the United States Patent and Trademark Office*